US007886219B2

(12) United States Patent
Lund

(10) Patent No.: US 7,886,219 B2
(45) Date of Patent: *Feb. 8, 2011

(54) AUTOMATIC FORM GENERATION

(75) Inventor: Christopher D. Lund, Escondido, CA (US)

(73) Assignee: EMC Corporation, Hopkinton, MA (US)

( * ) Notice: Subject to any disclaimer, the term of this patent is extended or adjusted under 35 U.S.C. 154(b) by 954 days.

This patent is subject to a terminal disclaimer.

(21) Appl. No.: 11/711,191

(22) Filed: Feb. 26, 2007

(65) Prior Publication Data

US 2008/0212845 A1 Sep. 4, 2008

(51) Int. Cl.
*G06F 17/20* (2006.01)

(52) U.S. Cl. ....................................... 715/222; 715/243

(58) Field of Classification Search .................. 715/222
See application file for complete search history.

(56) References Cited

U.S. PATENT DOCUMENTS

| | | | | |
|---|---|---|---|---|
| 5,652,835 | A * | 7/1997 | Miller | 714/38 |
| 5,926,825 | A * | 7/1999 | Shirakawa | 715/273 |
| 5,956,738 | A * | 9/1999 | Shirakawa | 715/273 |
| 6,366,918 | B1 * | 4/2002 | Guttman et al. | 707/690 |
| 2002/0059339 | A1 * | 5/2002 | McCormick et al. | 707/500.1 |
| 2002/0140982 | A1 * | 10/2002 | Nitta et al. | 358/1.18 |
| 2003/0188260 | A1 * | 10/2003 | Jensen et al. | 715/505 |
| 2003/0233296 | A1 * | 12/2003 | Wagner | 705/31 |
| 2004/0117731 | A1 * | 6/2004 | Blyashov | 715/507 |
| 2004/0194035 | A1 * | 9/2004 | Chakraborty | 715/531 |
| 2004/0223645 | A1 * | 11/2004 | Cliff | 382/186 |
| 2004/0225532 | A1 * | 11/2004 | Gadiyak et al. | 705/2 |
| 2005/0049815 | A1 * | 3/2005 | Watanabe et al. | 702/123 |
| 2005/0132278 | A1 * | 6/2005 | Yoshida | 715/513 |
| 2005/0216493 | A1 * | 9/2005 | Fujita | 707/100 |
| 2005/0223319 | A1 * | 10/2005 | Ohashi et al. | 715/517 |
| 2006/0045344 | A1 * | 3/2006 | Paxton et al. | 382/187 |
| 2006/0212413 | A1 * | 9/2006 | Rujan et al. | 706/20 |
| 2007/0053611 | A1 * | 3/2007 | Wnek | 382/294 |
| 2007/0089049 | A1 * | 4/2007 | Gormish et al. | 715/507 |

OTHER PUBLICATIONS

Titile: Groundtruth Generation and Document Image Degration, Author: Gang Zi, Date May 2005, pp. 1-62, url <http://www.dtic.mil/cgi-bin/GetTRDoc?AD=ADA447997&Location=U2&doc=GetTRDoc.pdf>.*

Title: Digital Test Decks and What they Can do for your Forms Processing System, A White Paper, Author: K. Bradely Paxton et al. Date: Feb. 11, 2003 URL: <http://www.adillc.net/Library/DTD_whitepaper.pdf>.*

Title: Health Information Technology Systems Automated Data Generation for Testing or Training Technical Capabilities Briefing, Date: Jun. 1, 2010, URL:<http://www.exactdata.net/wp-content/uploads/2010/06/Capabilities-Technical-Briefing-Healthcare-06-01-10.pdf>.*

* cited by examiner

*Primary Examiner*—Doug Hutton
*Assistant Examiner*—Mustafa Amin
(74) *Attorney, Agent, or Firm*—Barry N. Young

(57) ABSTRACT

A computer system and method for generating a plurality of unique forms, such as invoices or medical claim forms, that may be populated with data to produce test forms for testing automatic document processing systems. A blank form image is selected, and a layout data file is created that includes information on the locations of data fields on the blank form image, data types, and the formatting of data in the data fields. Corresponding data fields on each form are populated with different data sets comprising pre-defined data, random data or a combination of data to create a plurality different forms for the testing of the document processing system.

19 Claims, 8 Drawing Sheets

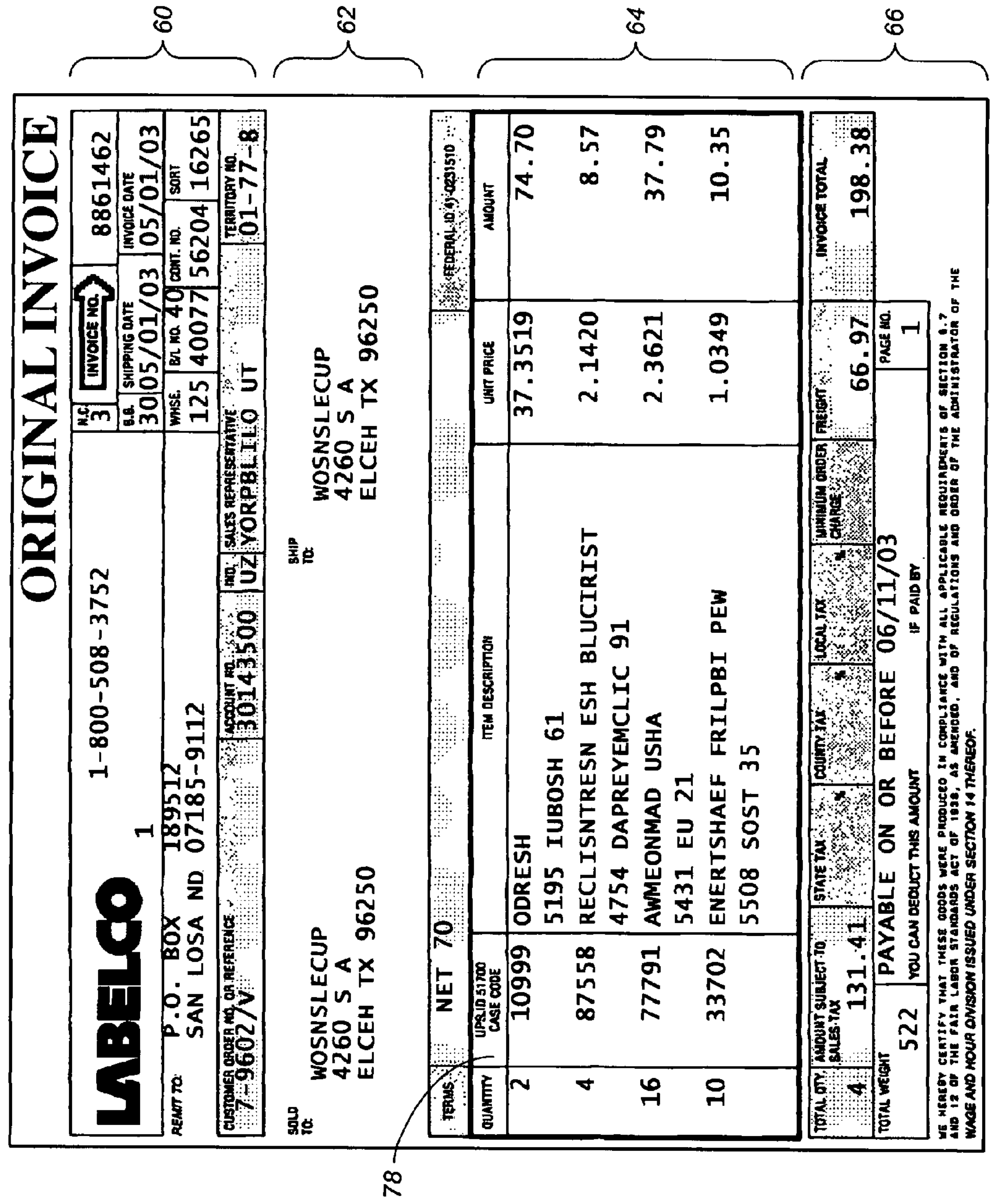

FIG. 3A

ORIGINAL INVOICE

LABELCO 1-800-508-3752

| | | | 8861462 |
|---|---|---|---|
| | | **INVOICE NO.** | |

REMIT TO: P.O. BOX 189512
SAN LOSA ND 07185-9112

{ 60 }

| CUSTOMER ORDER NO. OR REFERENCE | ACCOUNT NO. | IND. | SALES REPRESENTATIVE | N.C | INVOICE DATE | | | | TERRITORY NO. |
|---|---|---|---|---|---|---|---|---|---|
| 7-9602/V | 30143500 | UZ | YORPBLILO | 3 | 05/01/03 | | | | 01-77-8 |
| | | | | | SHIPPING DATE | WHSE. | B/L NO. | CONT. NO. | SORT |
| | | | | | 30 05/01/03 | 125 | 40077 40 | 56204 | 16265 |

SOLD TO: WOSNSLECUP
4260 S A
ELCEH TX 96250

SHIP TO: WOSNSLECUP
4260 S A
ELCEH TX 96250

{ 62 }

FEDERAL ID #: 0231510

| TERMS | UPLD 51700 CASE CODE | ITEM DESCRIPTION | UNIT PRICE | AMOUNT |
|---|---|---|---|---|
| NET 70 | | | | |
| QUANTITY | | | | |
| 2 | 10999 | ODRESH<br>5195 IUBOSH 61 | 37.3519 | 74.70 |
| 4 | 87558 | RECLISNTRESN ESH BLUCIRIST<br>4754 DAPREYEMCLIC 91 | 2.1420 | 8.57 |
| 16 | 77791 | AWMEONMAD USHA<br>5431 EU 21 | 2.3621 | 37.79 |
| 10 | 33702 | ENERTSHAEF FRILPBI PEW<br>5508 SOST 35 | 1.0349 | 10.35 |

78

{ 64 }

| TOTAL QTY. | AMOUNT SUBJECT TO SALES TAX | STATE TAX % | COUNTY TAX % | LOCAL TAX % | MINIMUM ORDER CHARGE | FREIGHT | INVOICE TOTAL |
|---|---|---|---|---|---|---|---|
| 4 | 131.41 | | | | | 66.97 | 198.38 |
| TOTAL WEIGHT | | | | | | PAGE NO. | |
| 522 | PAYABLE ON OR BEFORE 06/11/03 | | | | IF PAID BY | 1 | |
| | YOU CAN DEDUCT THIS AMOUNT | | | | | | |

{ 66 }

WE HEREBY CERTIFY THAT THESE GOODS WERE PRODUCED IN COMPLIANCE WITH ALL APPLICABLE REQUIREMENTS OF SECTION 6, 7
AND 12 OF THE FAIR LABOR STANDARDS ACT OF 1938, AS AMENDED, AND OF REGULATIONS AND ORDER OF THE ADMINISTRATOR OF THE
WAGE AND HOUR DIVISION ISSUED UNDER SECTION 14 THEREOF.

Invoice

Remit To: Labelco
P.O. Box 189512
San Lose, ND 07185-9112

Client: Wosnslecup
Snottefcrud Crufrayhaurt
4260 S A
Elceh, TX 96250

INVOICE NO.: 8861462
INVOICE DATE: 1-May-03
P.O. NUMBER 7-9602/V

| QUANTITY | PROJECT NO | DESCRIPTION | COST | AMOUNT |
|---|---|---|---|---|
| 2 | 389T5-2 | Odresh | $37.35 | $74.70 |
| 4 | 3BC067Z0 | Reclisntresn Esh Blucinst | $2.14 | $8.57 |
| 16 | 1Q/886-803 | Awmeonmad Usha | $2.36 | $37.79 |
| 10 | 6-71S-1 | Enertshaef Friipbi Pew | $1.03 | $10.35 |

INVOICE TOTAL: $131.41

INVOICED BY: YORPBLILO UT
PHONE NO.: (673) 646-5744

FIG. 4

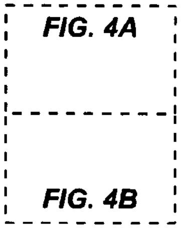

FIG. 4A

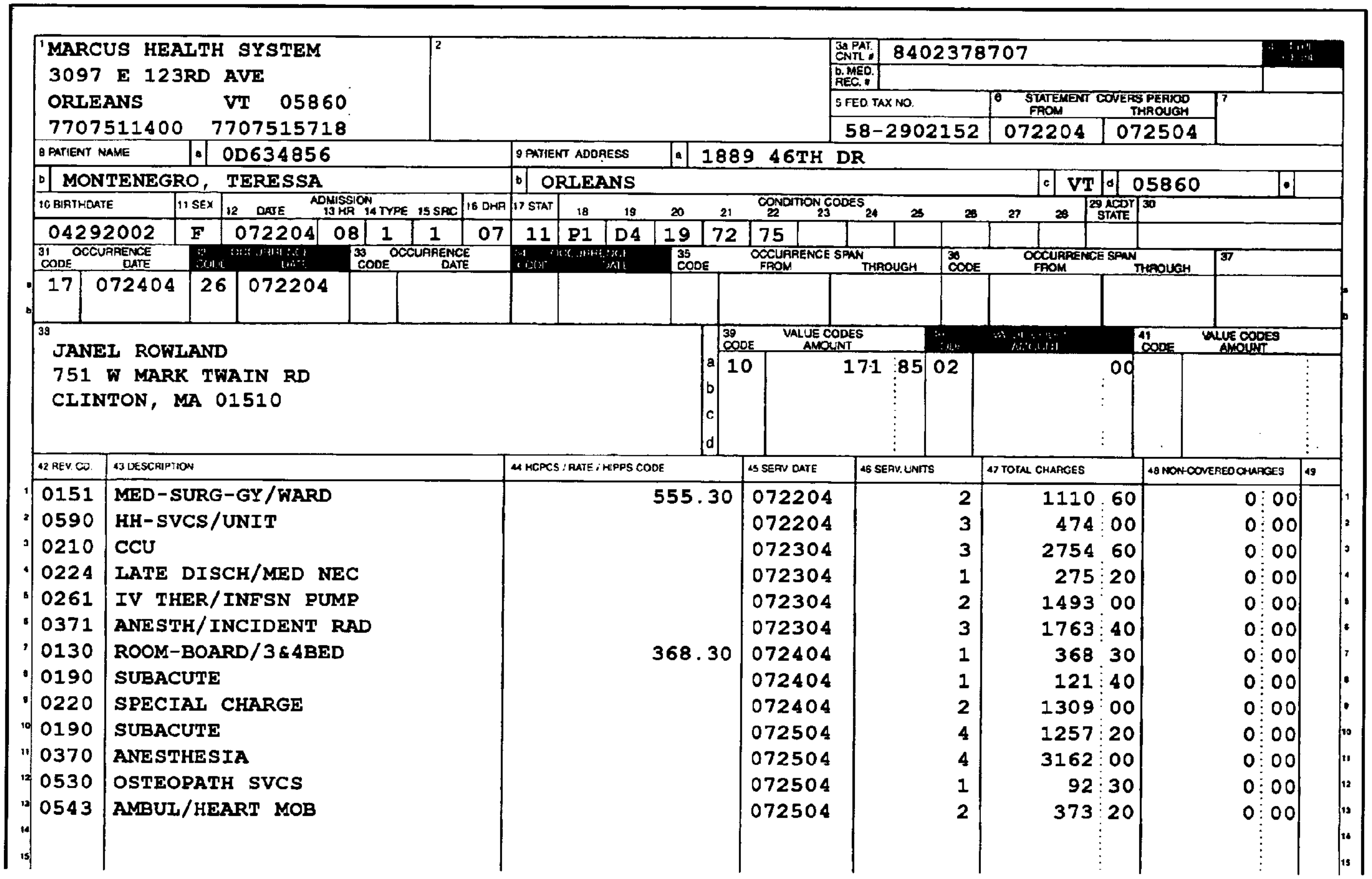

1 MARCUS HEALTH SYSTEM
3097 E 123RD AVE
ORLEANS VT 05860
7707511400 7707515718

3a PAT. CNTL # 8402378707
b. MED. REC. #
5 FED. TAX NO. 58-2902152
6 STATEMENT COVERS PERIOD FROM 072204 THROUGH 072504

8 PATIENT NAME a 0D634856
b MONTENEGRO, TERESSA
9 PATIENT ADDRESS a 1889 46TH DR
b ORLEANS c VT d 05860

10 BIRTHDATE 04292002 | 11 SEX F | ADMISSION 12 DATE 072204 | 13 HR 08 | 14 TYPE 1 | 15 SRC 1 | 16 DHR 07 | 17 STAT 11 | CONDITION CODES 18 P1 | 19 D4 | 20 19 | 21 72 | 22 75

31 OCCURRENCE CODE 17 DATE 072404 | 26 072204

38
JANEL ROWLAND
751 W MARK TWAIN RD
CLINTON, MA 01510

39 VALUE CODES CODE a 10 AMOUNT 171 85 | 02 00

| 42 REV. CD. | 43 DESCRIPTION | 44 HCPCS / RATE / HIPPS CODE | 45 SERV DATE | 46 SERV. UNITS | 47 TOTAL CHARGES | 48 NON-COVERED CHARGES | 49 |
|---|---|---|---|---|---|---|---|
| 0151 | MED-SURG-GY/WARD | 555.30 | 072204 | 2 | 1110 60 | 0 00 | |
| 0590 | HH-SVCS/UNIT | | 072204 | 3 | 474 00 | 0 00 | |
| 0210 | CCU | | 072304 | 3 | 2754 60 | 0 00 | |
| 0224 | LATE DISCH/MED NEC | | 072304 | 1 | 275 20 | 0 00 | |
| 0261 | IV THER/INFSN PUMP | | 072304 | 2 | 1493 00 | 0 00 | |
| 0371 | ANESTH/INCIDENT RAD | | 072304 | 3 | 1763 40 | 0 00 | |
| 0130 | ROOM-BOARD/3&4BED | 368.30 | 072404 | 1 | 368 30 | 0 00 | |
| 0190 | SUBACUTE | | 072404 | 1 | 121 40 | 0 00 | |
| 0220 | SPECIAL CHARGE | | 072404 | 2 | 1309 00 | 0 00 | |
| 0190 | SUBACUTE | | 072504 | 4 | 1257 20 | 0 00 | |
| 0370 | ANESTHESIA | | 072504 | 4 | 3162 00 | 0 00 | |
| 0530 | OSTEOPATH SVCS | | 072504 | 1 | 92 30 | 0 00 | |
| 0543 | AMBUL/HEART MOB | | 072504 | 2 | 373 20 | 0 00 | |

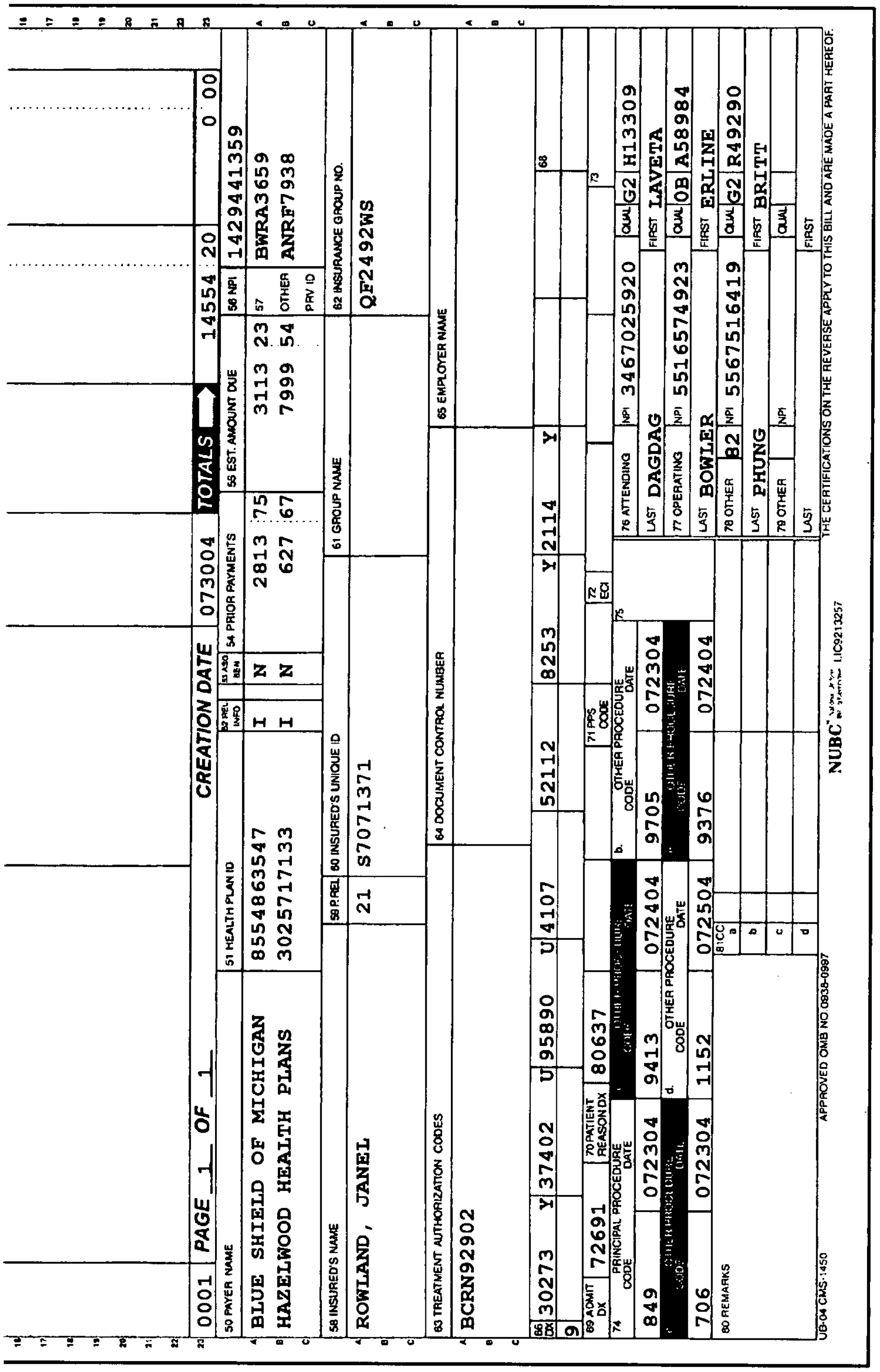
0001 PAGE 1 OF 1 CREATION DATE 073004 TOTALS 14554 20 0 00

| 50 PAYER NAME | 51 HEALTH PLAN ID | 52 REL INFO | 53 ASG BEN | 54 PRIOR PAYMENTS | 55 EST. AMOUNT DUE | 56 NPI | 1429441359 |
|---|---|---|---|---|---|---|---|
| A BLUE SHIELD OF MICHIGAN | 8554863547 | I | N | 2813 75 | 3113 23 | 57 | BWRA3659 |
| B HAZELWOOD HEALTH PLANS | 3025717133 | I | N | 627 67 | 7999 54 | OTHER PRV ID | ANRF7938 |
| C | | | | | | | |

| 58 INSURED'S NAME | 59 P.REL | 60 INSURED'S UNIQUE ID | 61 GROUP NAME | 62 INSURANCE GROUP NO. |
|---|---|---|---|---|
| A ROWLAND, JANEL | 21 | S7071371 | | QF2492WS |
| B | | | | |
| C | | | | |

| 63 TREATMENT AUTHORIZATION CODES | 64 DOCUMENT CONTROL NUMBER | 65 EMPLOYER NAME |
|---|---|---|
| A BCRN92902 | | |
| B | | |
| C | | |

66 DX 9 | 30273 Y | 37402 U | 95890 U | 4107 | 52112 | 8253 Y | 2114 Y | 68

69 ADMIT DX 72691 | 70 PATIENT REASON DX 80637 | 71 PPS CODE | 72 ECI | 73

| 74 PRINCIPAL PROCEDURE CODE | DATE | a. OTHER PROCEDURE CODE | DATE | b. OTHER PROCEDURE CODE | DATE | 75 |
|---|---|---|---|---|---|---|
| 849 | 072304 | 9413 | 072404 | 9705 | 072304 | |
| c. OTHER PROCEDURE CODE / DATE | | d. OTHER PROCEDURE CODE / DATE | | e. OTHER PROCEDURE CODE / DATE | | |
| 706 | 072304 | 1152 | 072504 | 9376 | 072404 | |

76 ATTENDING NPI 3467025920 QUAL G2 H13309
LAST DAGDAG FIRST LAVETA
77 OPERATING NPI 5516574923 QUAL 0B A58984
LAST BOWLER FIRST ERLINE
78 OTHER B2 NPI 5567516419 QUAL G2 R49290
LAST PHUNG FIRST BRITT
79 OTHER NPI QUAL
LAST FIRST

80 REMARKS
81CC a b c d

UB-04 CMS-1450 APPROVED OMB NO 0938-0997 NUBC LIC9213257 THE CERTIFICATIONS ON THE REVERSE APPLY TO THIS BILL AND ARE MADE A PART HEREOF.

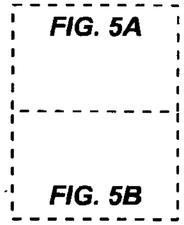

FIG. 5A

1 FORT WORTH MEMORIAL HOSPI
814 E C AVE
FORT WORTH TX 76155
7227549195 7227542809

3a PAT. CNTL # 1128972905
b. MED. REC. # 1881565536

5 FED. TAX NO. 38-6717948
6 STATEMENT COVERS PERIOD FROM 040705 THROUGH 041405

8 PATIENT NAME a 71986221
b ZILL, GLEN

9 PATIENT ADDRESS a 2286 LOW HORIZON WAY
b WAVERLY c WA d 99039

| 10 BIRTHDATE | 11 SEX | 12 DATE | 13 HR | 14 TYPE | 15 SRC | 16 DHR | 17 STAT | 18 | 19 | 20 | 21 |
|---|---|---|---|---|---|---|---|---|---|---|---|
| 01131993 | M | 040705 | 10 | 3 | 9 | 12 | 24 | A1 | 25 | 02 | 55 |

33
EDWARDO ZILL
2286 LOW HORIZON WAY
WAVERLY, WA 99039

39 VALUE CODES: a CODE 54 AMOUNT 2614

| 42 REV. CD. | 43 DESCRIPTION | 44 HCPCS / RATE / HIPPS CODE | 45 SERV DATE | 46 SERV. UNITS | 47 TOTAL CHARGES | 48 NON-COVERED CHARGES |
|---|---|---|---|---|---|---|
| 0423 | PHYS THERP/GROUP | | 040705 | 3 | 400 80 | 0 00 |
| 0023 | HH PPS (HRG) | | 040905 | 2 | 1333 20 | 0 00 |
| 0130 | ROOM-BOARD/3&4BED | 650.50 | 040905 | 1 | 650 50 | 0 00 |
| 0259 | DRUGS/OTHER | | 041005 | 1 | 166 17 | 35 23 |
| 0130 | ROOM-BOARD/3&4BED | 197.60 | 041105 | 2 | 395 20 | 0 00 |
| 0270 | MED-SUR SUPPLIES | 98216 | 041205 | 3 | 1800 60 | 0 00 |
| 0160 | R&B | 312.70 | 041305 | 3 | 938 10 | 0 00 |
| 0614 | MRI/OTHER | | 041305 | 4 | 662 80 | 0 00 |

AUTOMATIC FORM GENERATION

BACKGROUND

This application relates generally to image generation methods, and more particularly to the automatic generation of images of documents such as forms populated with data for testing of automatic document imaging and processing systems and methods.

In spite of the increasing prevalence of electronic data processing and communications systems and their widespread use in business, the goal of a "paperless" business environment has yet to be realized. Many modern businesses are still being inundated daily with increasing volumes of paper that must be processed as part of their normal business activities, and from which information must be extracted and utilized. For example, many businesses still rely upon paper forms for documents such as purchase orders, invoices, and the like. Processing such documents is labor intensive, time consuming and inefficient. Moreover, the need to transfer information from such documents to systems such as accounts payable or electronic order processing systems is subject to error. For businesses such as large retail chains processing the number of invoices that originate from the many different vendors who service the business, or from service providers to the business such as electricians, building maintenance providers, etc., represents a significant administrative burden. Data must be extracted from the invoices, validated against purchase orders and vendor data, and line items must be checked for correct units of measure and price, for instance. Moreover, businesses constantly receive documents of other kinds from a broad variety of different sources that must be captured electronically and processed. While current accounts payable, order processing, and other such electronic data processing systems do a good job of reducing the administrative burden of business procedures, a significant problem exists in extracting data from paper documents for input into electronic data processing systems.

The burden of manually extracting data from paper documents for input into electronic data processing systems has lead to the development of a number of different products and systems for optically processing paper documents to extract and digitize information from the documents. Optical character recognition (OCR), image character recognition (ICR) and similar approaches can read and extract data from documents. However, while information on a document may be correctly read, ascribing the appropriate meaning to the information is a formidable task. Most types of documents, such as invoices, are not standardized, and relevant information may appear on the document at different locations and in different formats. Different vendors may have invoices forms that have widely different appearances, even for the same kinds of products. Moreover, the paper forms may be creased or skewed in an optical scanner or include other types of artifacts such as extraneous markings, handwriting, or date or received inked stamps.

Similar problems exist in processing forms other than invoices and purchase orders. For example, insurance claim forms, credit card applications, and the like, all pose similar problems for optical scanning and automatic data processing systems. Accordingly, many different optical and document processing products have been developed or are in development for processing paper forms and similar documents to extract information for entry into back-end data processing systems. For example, the assignee of the present invention has developed computer hardware and software systems for processing forms to automatically identify, extract and perfect data for export into back-end databases or other systems, such as document or content management systems, or data processing systems. These automatic document and form processing systems are continually undergoing improvement and redesign to improve their performance and accuracy, as well as to extend them to different document processing applications. As with all engineering development programs, developing new products and approaches relies upon testing to determine whether they perform as designed and intended, and how their performance may be improved.

In order to test document processing systems and approaches that are undergoing development or improvement, a large number of samples of test documents are required. The test documents are processed by the systems, and the results of the processing are compared to the test documents to determine how well the system processed the documents. Generally, hundreds of different images of forms populated with data need to be generated for adequately testing accuracy, quality of processing, and throughput of the document processing application. Likewise, the ability of new system and products to process images that include extraneous information and artifacts such as rotations, shifts or other marks in the document needs to be tested, and appropriate test samples are required for this purpose. For certain types of documents, a large number of test documents having the same template but different information are required. To obtain adequate performance statistics to permit accurate predictions and performance probabilities of a document processing system, the large number of different test samples is necessary in order to derive sufficient representative statistical information as to the system performance. For instance, given a blank template of a medical claim form, hundreds of images of the claim form with different information may need to be generated in order to test the system's ability to accurately extract information from the forms and correctly interpret the extracted information. As with any statistical process, the greater the number of samples processed, the more accurate the performance predictions.

Generating the large number of test samples required for adequate testing of form processing systems and applications is itself a significant and time-consuming effort. The test samples needed should include as many different variations in format and data as can be reasonably anticipated to be encountered in use. To produce manually the large and varied number of test samples required is burdensome. Accordingly, what is needed is a system and method that affords the efficient, flexible and rapid production of a large number of different test samples of the types a document processing system is intended to process and that preferably have wide variations in data format and information content. It is desirable to provide systems and methods that satisfy these objectives and address other problems of testing of automatic document processing systems, and it is to these ends that the present invention is directed.

BRIEF DESCRIPTION OF THE DRAWINGS

FIG. 3A illustrates a first embodiment of an invoice form which may be produced by the invention;

FIG. 4, comprising FIGS. 4A and 4B, illustrates an example of a standard medical claim form populated with a first set of data in accordance with the invention; and FIG. 5, comprising FIGS. 5A and 5B, illustrates an example of the medical claim form of FIG. 4 populated with a different set of data in accordance with the invention.

DESCRIPTION OF PREFERRED EMBODIMENTS

Figure 1:
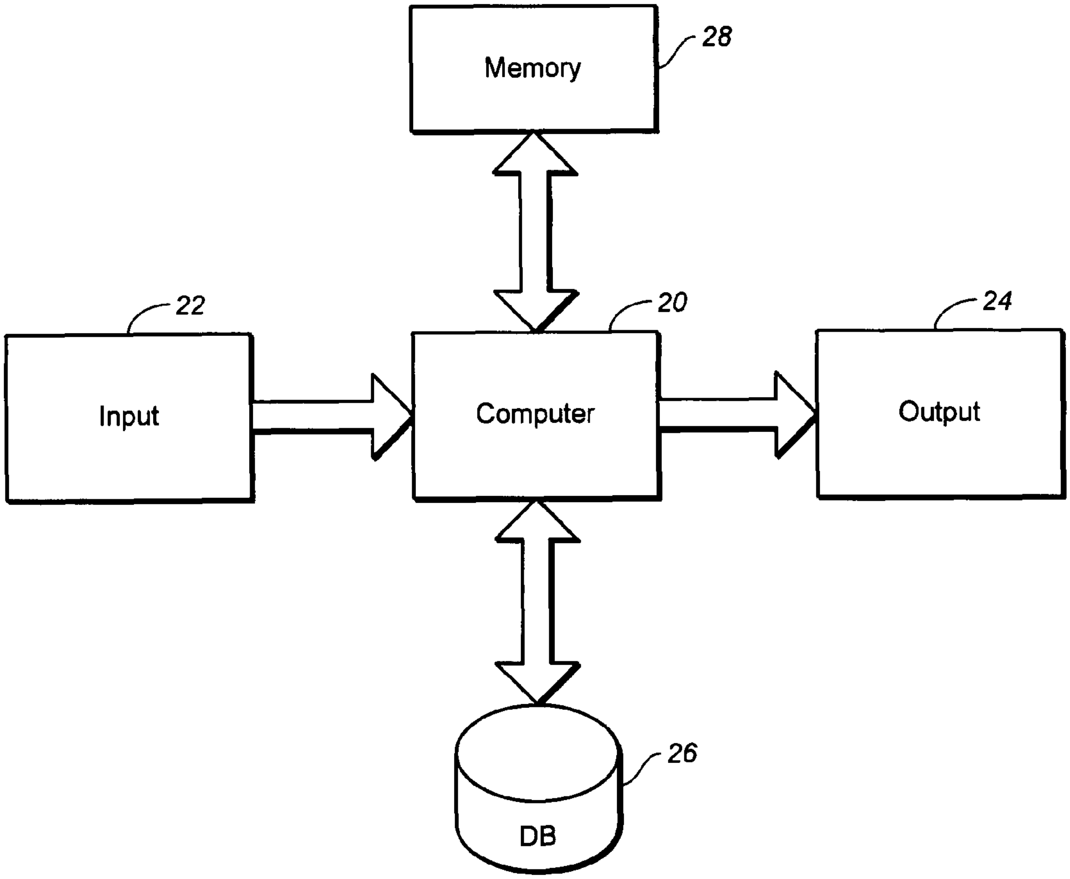
FIG. 1 is a block diagram of a computer system of the type which may embody the invention.

The invention is particularly well adapted for automatically generating images of documents, such as forms, and for producing a plurality of different forms such as invoices and medical claim forms, populated with different data sets, for testing automatic document processing systems and methods, and will be described in that context. However, as will be appreciated from the description which follows, the invention has greater utility, and may be used for generating other types of documents and for other purposes.

As noted above, adequate testing of document processing systems and software typically requires a plurality of different test samples, i.e., documents, for testing the performance and accuracy with which such document processing systems and software applications can identify, extract, perfect and process data from the test samples. Typical of the types of forms which such systems process are paper, electronic or faxed forms, such as insurance claim forms, invoices, credit applications, purchase orders, and the like. In order to verify the operation of document processing systems and software, and to determine the accuracy with which they can process forms, the invention enables the generation of a large number of unique test samples for processing by document processing systems so that sufficient statistics can be collected in order to accurately predict the probabilities of the systems and software correctly processing real forms. To accurately predict the performance characteristics of such document processing systems and software, forms may be produced that include a wide variety of different characteristics and data, as well as exhibit a wide variety of different artifacts such as may be encountered in processing actual forms. For instance, test samples of standardized forms which have a structured format, such as, for example, a standard UB-04 institutional medical claim form which is used to communicate claims information to insurance companies for processing medical and health care claims, a large number of unique test samples of the form to derive sufficient statistics to measure the ability of the document processing system to accurately read and interpret the data from the form. To produce the large number of unique test samples required, the invention iteratively populates a blank form image with different data. The data may be random data, real data, or a mixture of random and real data. The invention enables the automatic generation a large number of unique test form samples populated with different data.

As will be described in more detail, the invention may also generate semi-structured or substantially unstructured forms. Examples might be invoices, purchase orders or monthly statements, for instance. Such forms typically include certain data of the same type, such as, for instance in the case of invoices, invoice number, date, purchaser and seller information, quantities, unit pricing, etc., but the data may have different formats and be positioned at different locations on the form. The invention enables the creation of a large number of data-populated test samples of any type of form as defined by a blank form image and a layout data file.

Document processing systems and software must be able to accurately handle forms that contain artifacts, such as extraneous marks or handwriting, received or date stamps, creases, etc., or which are fed into the document processing system skewed or unaligned with the scanner. The invention also enables test samples of forms to be automatically created with these types of artifacts.

FIG. 1 illustrates an example of a computer system of the type which may embody the invention. As shown, the system may comprise a computer 20 having one or more input devices 22, and one or more output devices 24. Computer 20 may be connected to a database 26, and to a memory 28 embodying computer instructions for controlling the operation of the computer. As will be described in more detail shortly, memory 28 may include application software comprising computer instructions that control computer 20 to perform a method in accordance with the invention for creating test samples of forms or other documents for testing document processing systems. The test forms may be output at 24 onto a printer, for example. The database 26 may store data of various types for use in populating the forms created by the system. The data might comprise, for example, real data such as tables of real first and last names, cities, states, street names, etc., which may be selected in pre-defined ways or at random, as will be described, to populate blank form image templates. Database 26 also may be used for storing electronic images of the forms, for example, as TIFF files, and for storing text files of the data populated on forms to be used as “answers” in evaluating the performance of the document processing systems in processing the test forms. Computer system 20 may comprise a stand-alone computer, or it may be a server computer of a larger computer system. Input device 22 may comprise a terminal or a personal computer, for example, for operator input, and output device 24 may comprise a printer for producing a hard copy of the forms, as well as a device for outputting electronic images of the forms created.

Figure 2:
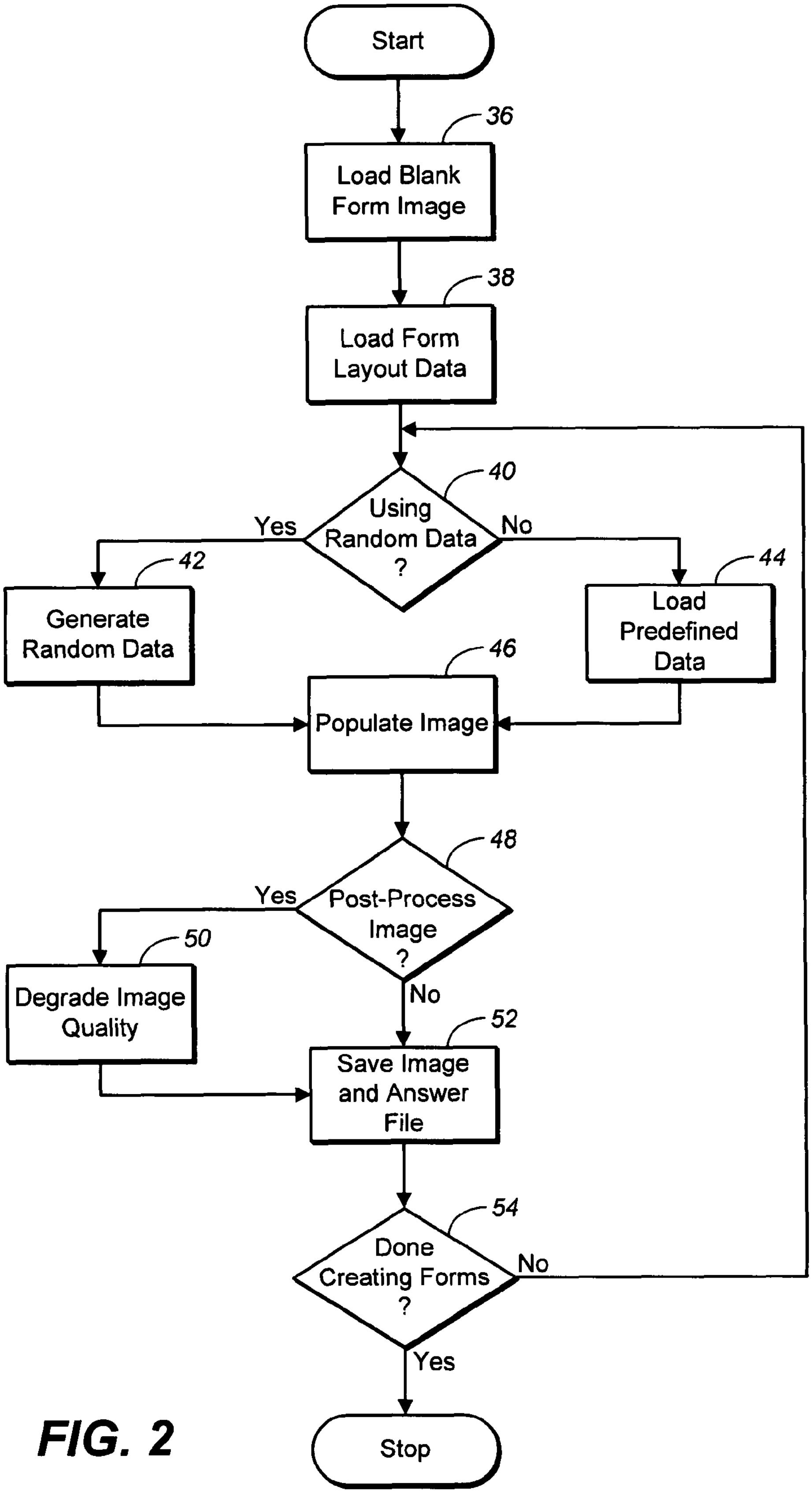
FIG. 2 is a flow chart illustrating a process in accordance with the invention for populating a form with data.

FIG. 2 is a flow chart that illustrates a process in accordance with the invention for populating a form with data to create test samples. The process illustrated in FIG. 2 may be embodied in the application software instructions in memory 28 and be performed by computer 20 of FIG. 1. The process shown in FIG. 2 is for creating forms based upon a predetermined form template comprising an image of the blank form and a pre-defined data layout, and for populating the blank forms with data. The process may be employed for creating a plurality of forms based on the same blank form image but populated with different data. Moreover, by appropriately defining the blank form image and the form layout data, as will be described below, a plurality of different forms populated with the same or different data may be automatically generated.

Referring to FIG. 2, the process begins by loading a blank form image at 36 and loading form layout data at step 38. The blank form image may comprise an image of a blank form, such as a TIFF image. The form layout data may comprise an XML file indicating where data is located on a form and how the data looks. The XML file may indicate the locations of fields on the form into which data is inserted relative to a reference point, such as a top corner of the form, and may define how data fields and the data itself are formatted. This information is used for populating the fields with data.

The form may be populated using either random data or pre-defined data, or some combination of the two. At step 40, if a decision is made to use random data, the process moves to step 42 at which the random data that is used to populate the form is generated. The random data may be obtained from a database lookup, such as database 26 of FIG. 1, or it may be data that is randomly generated by the application. For a database lookup, the database may include real information that is related, such as tables of city, state and zip code, for example, and from which elements of the data may be selected. The database may also include tables of data elements such as first and last names which can be randomly selected by the application to populate a "names" field. The database may similarly comprise tables of real street names which can be used to populate a field for a street name; and an address number may be a randomly generated number.

For some types of forms, it may be desirable to select data for populating one field that has an association with the data in another field. For example, if a form has a field for gender, as, for instance, in a medical health claim form or a credit application, it may be desirable to populate a names field with first names of the same male or female gender that is populated in the gender field. This may be done, for example, by storing tables of data related by certain characteristics, e.g., according to male and female first names, and associating the tables with the types of data populated in another field by defining the data characteristics for the relevant field in the layout data definition. A name field, for example, may be populated by randomly selecting a first name from the appropriate table.

Instead of generating random data, the form may be populated with pre-defined data at step 44. Pre-defined data may be real data, as for real people or places, such as real names, addresses, etc. Real data may also be mixed and matched in a random way, in which case the data will have the characteristics of random data. Alternatively, the data may pre-defined and selected according to particular criteria for different purposes.

At step 46, the blank image of the form is populated with the data selected by placing the data in the appropriate fields and formatting the data and the fields as indicated in the form layout data from step 38.

At step 48, the process affords an option to post-process the image of the form. If this option is selected, at step 50 the populated form image may be degraded, as, for example, by adding artifacts to the image. Artifacts may be selected and used to add noise to the document image in order represent conditions that might be encountered on a real document. Artifacts might include, for example, creases, smudges, crinkles or speckles, handwriting or "received" or "date" stamps that may partially obscure the data in some fields. All of these noise factors simulate real document conditions and are useful in testing the ability of the document processing system to accurately identify, extract and perfect the data from a degraded image of a form, and may be specified in the definition of the bank form. At step 52 the image of the form is saved along with an answer file. The answer file may comprise a text file of the data populated onto the form that may be compared to the output of the document processing system to gauge its performance and accuracy. At step 54, the process may be iterated to create additional test samples of forms. For each iteration of the process, at least some of the data fields of the form are preferably populated with different data, and the form may also be degraded with different artifacts or in a different way so that the resulting test sample of the form is unique.

FIGS. 3-5 illustrate examples of different types of forms which may be produced by the invention. FIGS. 3A and B illustrate, respectively, two different invoices which contain the same information but are on different form templates having different data formats and layouts. The form templates may be randomly structured. FIGS. 4 and 5 illustrate a standardized form populated with different data.

Referring to FIG. 3A, the invoice may include major blocks or portions, including a header 60, 62, a footer 66 and a main body 64 area. The header portions 60 and 62 may include fields that contain information related, for example, to the seller, to the purchaser and to information concerning the invoice. As shown, in portion 60, the invoice may contain the seller's name and logo "LABELCO", remittance address, the invoice number "8861462", the invoice date "May 1, 2003", customer order number "7-9602N", etc. Portion 62 of the header may include the purchaser's name and the shipping address. The next portion 64 of the invoice comprises the body or "line item layout" of the invoice. This is the area that lists information, such as shown, for quantities, part numbers, item descriptions, unit prices and amounts for each item purchased. Finally, the footer 66 of the invoice may provide other additional information such as the shipping weight "522" and the invoice total amount "198.38", and the payment due date. The foregoing is merely representative of information the invoice may contain. As will be appreciated, the invoice could contain many other types of information.

Figure 3B:
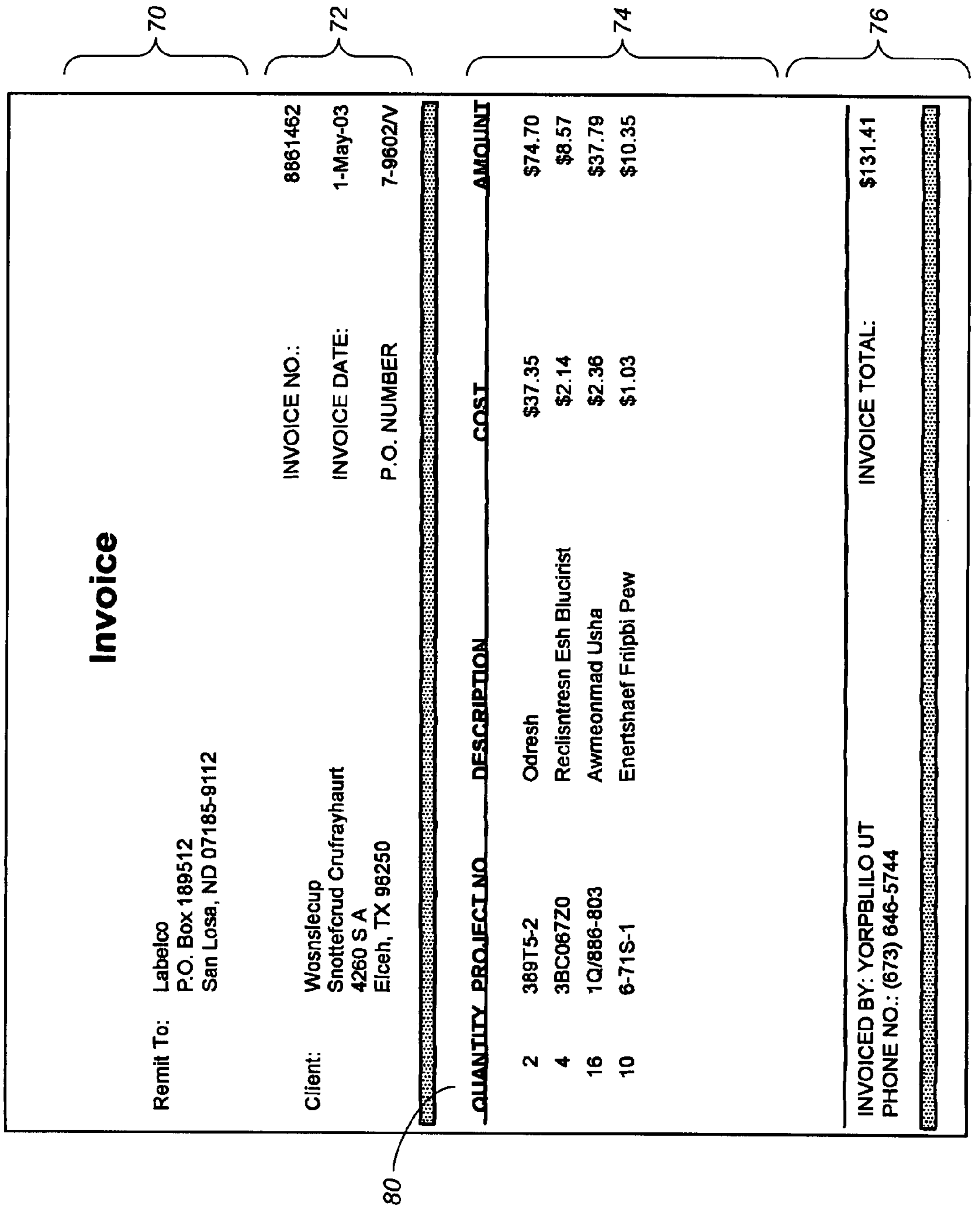
FIG. 3B illustrates a second embodiment of an invoice form that may be produced by the invention.

The invoice shown in FIG. 3B is another invoice form for the same items covered in the invoice of FIG. 3A. It likewise has a header comprising portions 70 and 72, a body or line item portion 74 and a footer portion 76. However, the template form of the invoice of FIG. 3B is substantially different from that of FIG. 3A, as may be seen. Moreover, the data layout and format is different. The top portion 70 of the header may contain the name and address of the seller "Labelco" and the document label "Invoice" prominently indicated in the center of the header. The second portion of the header 72 may include the purchaser's name and address, and information such as the invoice number, invoice data and purchase order (P.O.) number, all of which appeared in portions 60 and 62 on the invoice of FIG. 3A, but in different locations. In the line item portion 74 of the invoice of FIG. 3B, data is included that is similar to that which was present in portion 64 of the invoice of FIG. 3A, except the columns are not all the same and the data is not formatted in the same way in the columns. For instance, the second column 78 in the invoice of FIG. 3A has a column label that indicates "Case Code", whereas the second column 80 of the invoice of FIG. 3B is entitled "Project No.", and the columns include different information. Moreover, the other column headings are different, as shown, and the dollar amounts shown in the invoice of FIG. 3B use the dollar sign "$", whereas those in the invoice of FIG. 3A do not. Finally, the footer 76 of the invoice of FIG. 3B includes different information from the footer 66 of FIG. 3A. The invoice total in FIG. 3B, for instance, does not include sales tax which is included in the invoice total of FIG. 3A.

The invoices of FIG. 3 illustrate that by employing different templates (blank form images) for the forms and using different form layout information (layout data files), a large number of differently structured invoices may be created. Moreover, for testing purposes, some of the data populated on the forms may be "nonsense", as shown.

FIGS. 4 and 5 illustrate the results of a process in accordance with the invention as illustrated in FIG. 2 in populating the same structured standard blank form with different information. As shown, the form may be a standard institutional UB-04 OMB-approved medical claim form that is used for submitting claims information to insurance companies for reimbursement of hospital and medical expenses. As shown, the forms of FIGS. 4 and 5 may be identical form images, but the data populated onto the images may be quite different. Also, the form of FIG. 4 is gender specific for a female, whereas the form of FIG. 5 is gender specific for a male. This is shown by reference to field "11 SEX" on the form. In order to make the data on the form realistic, the patient's name in field "8*b*" may be associated with the gender selected for field "11", so that a female first name may be populated into the patient name field "8*b*" of FIG. 4, whereas a male first name may be populated into the patient name field "8*b*" of FIG. 5.

Figure 5B:
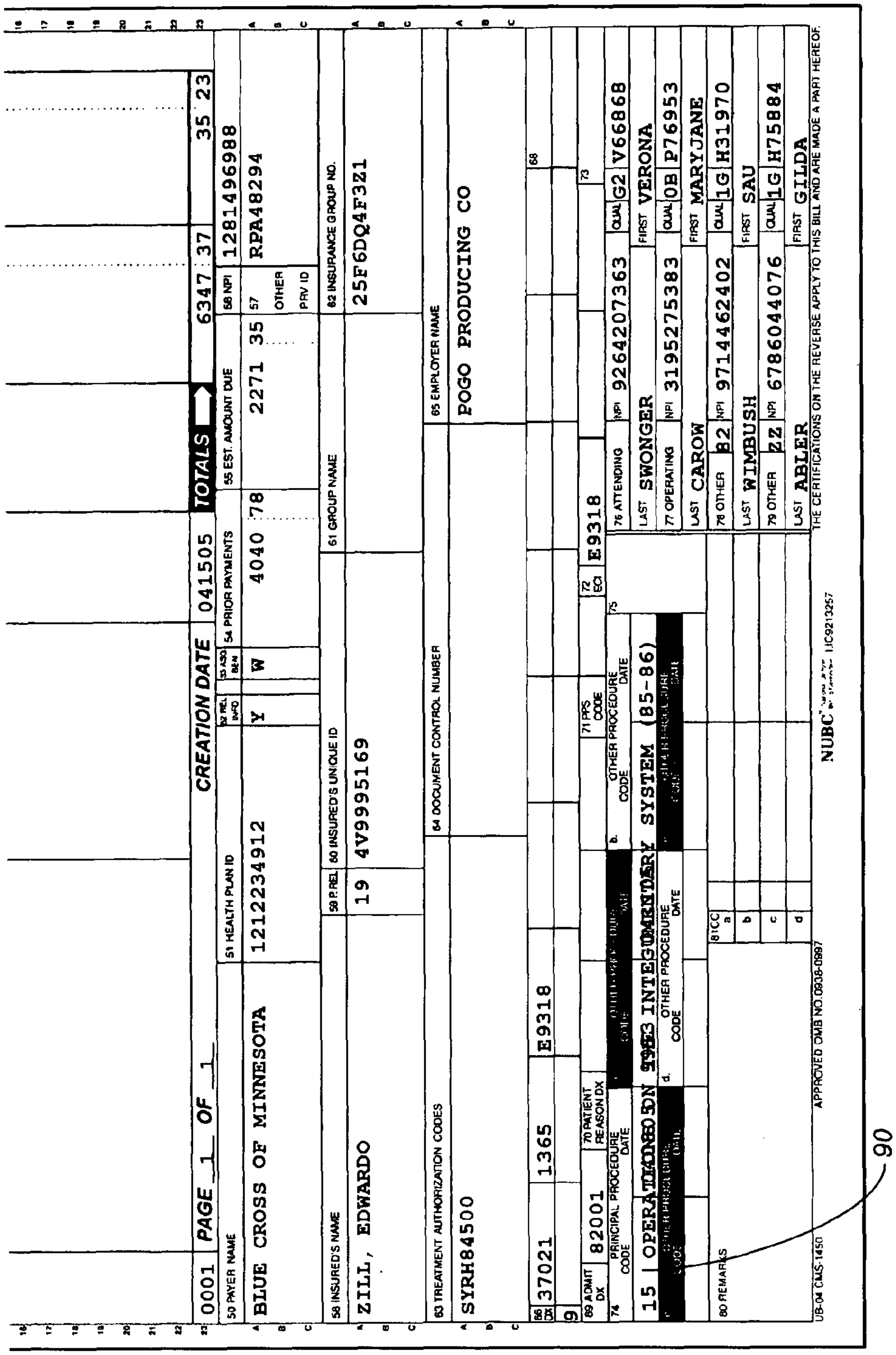

Other field associations on the medical claim forms of FIGS. 4-5 may also be employed in order to make the forms more realistic. For instance, the diagnostic codes in field "66" (FIGS. 4B, 5B) may be correlated with the treatment codes in field "74" so that the treatments match the diagnosis. This may be accomplished, as will be described shortly, by tagging the variables that define the data which is inserted into fields appropriately so that there is a relationship between the data which is selected for the various fields. An example of one type of an artifact is shown on FIG. 5B at 90, where the data in the "Principal Procedure" field "74" and the Other Procedure" field "75" has been partly obscured by other information which is overlaid on top of the data, such as would occur by mistyping the form, for example.

An example of the structure and form of the XML code for generating the data for populating a form will now be described with reference to examples of ways the XML code may be structured. The following example illustrates code structured for generating invoices and medical claim forms, and is illustrative more generally of ways in which XML code may be constructed to generate any of type of form.

The basic structure of the XML code for generating the data for a form may comprise a number of different tags and structures that define, for instance, the location, structure, format, and value of the data in well understood ways. Representative examples showing the general format for the XML data are as follows:

```
<object>
<font>
<!-formatting information -->
</font>
<box>x y width height</box>
<value>some string</value>
</object>
```

The tag <object> may be either a <field> or a <group> tag.

The code may include <field> and <group> tags. A <field> tag describes a single output text string. A <group> tag is used to collect together one or more <field> tags. Commonly, this would be done in order to use similar formatting for more than one field element without having to specify formatting for each field individually. For example, in the XML fragment below, two fields, each containing the name of a fruit, are both formatted using uppercase characters. Without the group tag, the <font> would have to be repeated for each field. The XML code would be:

```
<group>
<font>
<case>upper</case>        (font = uppercase)
</font>
<field>                   (1st field)
<box>10 10</box>          (font width height)
<value>Apple</value>      (field value = Apple)
</field>
<field>                   (2nd field)
<box>10 50</box>          (font width height)
<value>Pear</value>       (field value = Pear)
</field>
</group>
```

The <group> tags may also be used for XML display purposes when using an XML editor that supports the collapsing of tags.

In addition to <field> and <group> tags, a tag may be used to create variables. A <set> tag may have child tags, <var>, the name of the variable, and <value>, the value for that variable, with contents as described, for instance, for the <value> tag below. As an example, to set the variable "OneDigit" to a single digit, the following XML code may be employed:

```
<set>
<var>OneDigit</var>
<value>@(::0)</value>
</set>
```

A <box> structure gives the coordinates and size of the location where the formatted data should be placed on the image. All coordinates are preferably calculated using pixels, and referenced to a predetermined location on the image. The "height" value of the structure is optional; if no height is specified, the height of a single line of text will be used. If a value is present for "width", the output will be formed to that width size. If the width value is missing, no cropping of the structure will be performed.

The <font> tag is used to describe the formatting of the generated output. It may include different segments specifying different font options, including, for example:

| | |
|---|---|
| <family>Times New Roman</family> | (where the family value "Times New Roman" is the name of a font on the machine on which the application is run) |
| <size>10</size> | (specifies the size of the font in points) |
| <style>bold<style> | (specifies the style of the of the font, e.g., "bold") |
| <case>upper</case> | (specifies the case of the characters, e.g., uppercase characters for all output regardless of the case used in the string) |
| <align>right</align> | (specifies the alignment of the output, e.g., right justified, and requires that a "width" value be provided in the <box> field to indicate the location of the right edge of the field) |

The <value> tag contains the formatted output for the given field. This tag may be a combination of literal strings, variable lookups, or random generated data. For example, to format a name stored in the "Employee" variable, a US "state", and a single random "digit" along with some static text, the value contents may look like:

Name: @(Employee), state: @(:state), digit: @(::0)

Data may be represented using "@" "("and")" symbols with three field segments separated by colons. An example of a full structure of a field is @(Variable:values:format). The field segments may be as follows:

Variable: If the variable segment is populated, then the field will be replaced by the contents of that variable.

Values: This is semi-structured data that can be generated using the values segment of the field. The values segment may be divided into "named" and "non-named" segment types.

A principal "non-named" type is "{low}, {high}" which generates a number between low and high, not including high itself. For example, "@(:1,5)" will randomly generate one of the numbers 1, 2, 3, or 4.

Named values segment types may take the form:

"name[param1,param2 . . . ]". Examples are listed in Table 1 below.

TABLE 1

| Named Value Types | |
|---|---|
| Name | Meaning |
| date[firstYear, yearRange] | A random date between firstYear and firstYear + yearRange. If firstYear is omitted, a preselected year, e.g., 2006 is used. If yearRange is omitted, the number of years between firstYear and the preselected year 2006 is used. |
| randline [file] | A random line from the file "file". |
| one of [a,b,c,d] | A random element in the list: a, b, c, or d for an arbitrary number of listed elements. |
| phone | A US telephone number |
| Address | An address consisting of a house number, direction, and "word" street name. An example might be "123 N Main" |
| city | A random "word" (see word below) |
| state | A valid US state |
| zip | A US Zip code |
| word | A single random "word" consisting of meaningless characters |
| phrase [low,high] | A phrase of low-high "words". If low or high are omitted, the values 1 and 3 are used, respectively. |

The format segment describes how a variable or value data is formatted. If both fields are missing, as, for example in "@(::0)", then the format string may be assumed to be a mask with "0" representing a digit and "@" representing a letter. For example, two letters followed by three digits would be formatted as "@(::@@000)". All other formatting characters may be taken as their literal meanings.

For "named" field types, the following Table 2 shows examples of some of the formatting options.

TABLE 2

| Named Field Type Formatting | | |
|---|---|---|
| Named Field Type | Formatting | Meaning |
| Date | MM | The two-digit month for that date |
| | dd | The two-digit day for that date |
| | yyyy | The four-digit year for that date |
| phone | 000 | The area code |
| | 000-0000 | The number without the area code |
| | (000) 000-0000 | The full phone number formatted |
| | 0000000000 | The full phone number as a single 10-digit string |
| Zip | 00000 | The 5-digit zip code |
| | 00000-0000 | The Zip + 4 form of the zip code |

A <select> tag works the same as a "switch" statement in the C programming language. The value to be selected is determined with a <value> tag, and the C-equivalent "case" is described with an <option> tag. The <value> in the <option> tag may be the value for that option, and all other tags inside the option may be literals. For example, to set the variable "LetterGender" to a value "M" if "Gender" is "male" and to a value "F" otherwise, the XML code would be, for example:

```
<select>
<value>@(Gender)</value>
<option>
<value>male</value>
<set>
<var>LetterGender</var>
<value>M</value>
</set>
</option>
<option>
<value>female</value>
<set>
<var>LetterGender</var>
<value>F</value>
</set>
</option>
</select>
```

The XML code may include two internal predefined structures of type, such as for "Person" to be "Patient" and "Insured", for instance. The structures may be defined, as shown follows:

To print "Public, John Q.", the <value> segment may contain:

@(Patient.LastName), @(Patient.FirstName) @(Patient.MI)

The "Person" structure may have the fields shown in the following Table 3:

TABLE 3

| Person Structure Fields | |
|---|---|
| Field | Meaning |
| Male | 1 if the Person is male, 0 otherwise |
| Female | 1 if the Person is female, 0 otherwise |
| FirstName | A random gender-appropriate first name found in the US |
| LastName | A random last name found in the US |
| MI | A single character |
| BirthDate | A date between e.g., 1920-1986. If Patient is a child, the random birth year is 1986-2006. |
| Home | A Location structure. If Patient is related to Insured, this will be the same address as Insured. |
| Phone | A US phone number. If Patient is related to Insured, this will be the same phone number as Insured. |
| Relationship | Self for insured. Self, Spouse, Child, or Other for Patient. |

The Location structure may have the fields shown in the following Table 4.

TABLE 4

| Location Structure Fields | |
|---|---|
| Field | Meaning |
| Address | An address as described in Values |
| City | A city as described in Values |
| State | A US state as described in Values |
| Zip | A zip code as described in Values |

Although the foregoing example of XML code is illustrative for generating invoices and medical claim forms, it will be appreciated that the code may be readily changed as desired and other XML code may be employed for generating data for other types of forms using a similar approach as that described above.

As previously described, the layout form data comprises XML code that defines the data structure and format for the blank form image being populated, and specifies completely the overall structure, format and content characteristics of the blank form so that the blank form image may be populated with data. Appropriate XML code may be used to define the different major blocks of the form, such as a header, a footer, and a main body or line-item portion in the case of an invoice form, the data fields within a block, their orientations, such as horizontal or vertical, data layout, and other characteristics of the fields and data. The code may also define various static "decorative" elements of the form. Static elements may serve as "decoration" for the form as, for example, a shipping address, which may play no role in processing of the form, but increases the realism of the final form. Heading labels, such as "Ship To:" may be part of the blank for image. As explained above, the XML layout data file indicates locations of fields on the form, its appearance characteristics, and formats for the fields and data.

The various header fields that will appear on the form and the order of the fields may be similarly be defined in the XML code. This may include definition of the types of fields and the types of data the fields contain. The form, however, may determine the layout and content, such as the orientation of the header fields as being horizontal, and that the name of the person who placed the order is not included, and that the field ordering will be invoice date to the left in the header and the invoice number to the right. The code may also define the position of a field within a block (e.g., the header). This is different from field ordering, as it relates to the placement of the fields on the form. For example, in the case of an invoice, the vendor's name may be on the left and the invoice information may be on the right of the header, or these data fields may be reversed. This may all be specified in the XML code to correspond with the image of the blank form, and to populate the form with data in the process of FIG. 2.

In defining the line-layout or body portion of the form, the code may define the number of columns sizes, and positions of the columns for the blank image. The form may prescribe the column headings, such as "Part No.", "Description", "Units" and "Price", etc. Column positions may be defined by using pixel coordinates, or by some other appropriate unit of measure, referenced to a particular location of the block or the document, such as a corner. In addition to defining columns, the number of rows, their sizes and locations may also be defined.

As will be appreciated from the foregoing, by using different blank form images and appropriate XML code, the process of FIG. 2 may be employed for generating many different types of forms, and may be iterated multiple times in order to generate multiple populated form images.

While the foregoing has been with reference to preferred embodiments of the invention, it will be appreciated that changes in these embodiments may be made without departing from the principals in the spirit of the invention, the scope of which is defined in the appended claims.

The invention claimed is:

1. A method of automatically generating a plurality of forms for testing an automatic document processing system, the method being performed by a programmed computer, comprising:

generating a layout data file for a blank form image that includes information on locations of data fields on the blank form image, types of data in each of said data fields, and formatting of data in said data fields;

populating in accordance with said layout data file the data fields of the blank form image with a first data set to create a first test form, the first data set comprising, for each of said data fields, randomly selecting data that conforms to said layout data file for each such data field;

saving an answer file containing the first data set used for creating said first test form; and repeating said populating and said saving steps multiple times with multiple other data sets to create multiple different test forms and corresponding answer files for said testing of said of an automatic document processing system.

2. The method of claim 1 further comprising repeating the foregoing steps for a different layout data file for a different blank form image to create multiple other test forms corresponding to said other blank form image.

3. The method of claim 1 wherein said data layout file defines data variables for said data fields, and wherein said populating comprises populating said fields with randomly selected data from pre-defined data values corresponding to said data variables.

4. The method of claim 3, wherein said populating comprises randomly selecting said pre-defined data values from data values stored in a database.

5. The method of claim 4, wherein said database comprises tables of data values for each of said different types of data, and said randomly selecting comprises randomly selecting data values from said tables for each of the data fields.

6. The method of claim 1, wherein said randomly selecting data comprises generating random data for each of the data fields.

7. The method of claim 1, wherein said layout data file comprises code, and said populating comprises generating said first data set and overlaying said data set onto said blank form image in accordance with said code.

8. The method of claim 1, wherein said generating comprises defining associations between predetermined fields, and said populating comprises populating said predetermined fields with data consistent with said associations.

9. The method of claim 8, wherein said predetermined fields comprise a gender field and a name field, and wherein said populating comprises populating said name field with a name corresponding to a gender specified in the gender field.

10. The method of claim 1 further comprising degrading the image quality of said blank form image with artifacts to simulate an actual document.

11. The method of claim 10, wherein said degrading comprises adding artifacts comprising one or more of creases, smudges, speckles, handwriting, stamps and overtyping that obscures data.

12. The method of claim 1 wherein said form is selected from one of an invoice, a purchase order, a medical claim, and a monthly statement.

13. A computer storage readable medium embodying program instructions for controlling the operation of a computer to perform a method of automatically generating a plurality of forms for testing an automatic document processing system, the method comprising:

generating a layout data file for a blank form image that includes information on locations of data fields on the blank form image, types of data in each of said data fields, and formatting of data in said data fields;

populating in accordance with said layout data file the data fields of the blank form image with a first data set to create a first test form, the first data set comprising, for each of said data fields, randomly selecting data that conforms to said layout data file for each such data field;

saving an answer file containing the first data set used for creating said first test form; and repeating said populating and said saving steps multiple times with multiple other data sets to create multiple different test forms and corresponding answer files for said testing of said of an automatic document processing system.

14. The computer readable medium of claim 13, wherein said layout data file defines data variables, and said populating comprises populating said fields with randomly selected data from pre-defined data values corresponding to said data variables.

15. The computer readable medium of claim 14, wherein said randomly selecting comprises randomly selecting data from pre-defined data and random data.

16. The computer readable medium of claim 13, wherein said generating comprises defining data locations on said blank form image relative to a reference location on said blank form image.

17. The computer readable medium of claim 13, wherein said generating comprises creating an XML file defining where data are located within data fields, and defining the types and formats of the data.

18. A computer system comprising a computer embodying instructions for controlling the operation of the computer to generate a plurality of forms for testing an automatic document processing system, the computer system operating to:

generate a layout data file for a blank form image that describes the locations of data fields on the form, types of data in the data fields, and formatting of data in said data fields;

populate at least some of the data fields of the blank form image with a first data set to create a first test form, the first data set comprising, for each of said data fields, randomly selecting data that conforms to said layout data file for each such data field;

save an answer file containing the first data set for used to create said first test form; and repeat said populating and said saving operations multiple times with multiple other data sets to create multiple different test forms and corresponding answer files for said testing of said of an automatic document processing system.

19. The computer system of claim 18, wherein said computer system comprises an output device for outputting said populated blank form image.

* * * * *